(12) United States Patent
Dekorsy et al.

(10) Patent No.: US 6,618,423 B1
(45) Date of Patent: Sep. 9, 2003

(54) PASSIVELY MODE-COUPLED FEMTOSECOND LASER

(75) Inventors: Thomas Dekorsy, Ullersdorf (DE); Albrecht Bartels, Aachen (DE); Heinrich Kurz, Aachen (DE)

(73) Assignee: Gigaoptics GmbH, Muhlheim am Main (DE)

( * ) Notice: Subject to any disclaimer, the term of this patent is extended or adjusted under 35 U.S.C. 154(b) by 0 days.

(21) Appl. No.: 09/979,165

(22) PCT Filed: May 19, 2000

(86) PCT No.: PCT/DE00/01584
§ 371 (c)(1),
(2), (4) Date: Feb. 20, 2002

(87) PCT Pub. No.: WO00/72412
PCT Pub. Date: Nov. 30, 2000

(30) Foreign Application Priority Data

May 21, 1999 (DE) .......................................... 199 23 541
Dec. 16, 1999 (DE) .......................................... 199 60 765

(51) Int. Cl.$^7$ .............................................. H01S 3/083
(52) U.S. Cl. .......................................... 372/94; 372/18
(58) Field of Search .......................... 372/18, 102, 100, 372/107, 94; 359/326

(56) References Cited

U.S. PATENT DOCUMENTS 5,163,059 A * 11/1992 Negus et al. ................. 372/107
5,212,698 A * 5/1993 Kafka et al. .................. 372/100

(List continued on next page.)

FOREIGN PATENT DOCUMENTS

| DE | 196 35 919 A1 | 3/1997 | ........... H01S/3/093 |
| DE | 199 60 765 A1 | 11/2000 | ........... H01S/3/083 |

OTHER PUBLICATIONS

Kasper A et al: "10-FS Pulse Generation from a Unidirectional Kerr–Lens Mode–Locked TI: Sapphire Ring Laser" Optics Letters, US, Optical Society of America, Washington, vol. 21, No. 5, Mar. 1, 1996, pp. 360–362, XP000559758 ISSN: 0146–9592 Abstract.

(List continued on next page.)

*Primary Examiner*—Paul Ip
*Assistant Examiner*—Hung T Vy
(74) *Attorney, Agent, or Firm*—Shaw Pittman LLP

(57) ABSTRACT

The invention relates to a passive mode locked femtosecond laser whose ring resonator comprises the elements: a) a laser-active element 1, b) at least a dielectric mirror 2 having a negative group velocity dispersion GVD such that for a continuous part of the optical spectrum amplifieable by the laser-active element the sum of the group velocity dispersion of the mirror 2 and the positive group velocity dispersion of the laser-active element 1 is negative, i.e.

$$\sum_n GVD_n < 0$$

Figure 1:
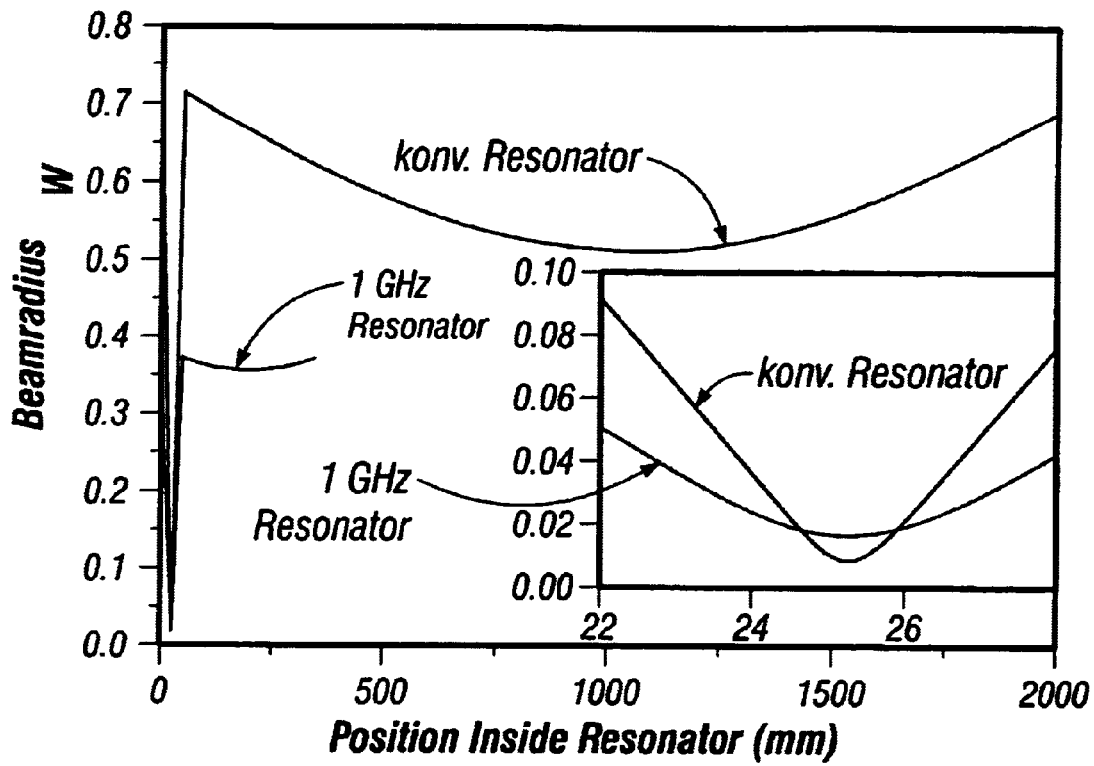

c) two concave mirrors 21 and 22 which are spatial adjacent next to the laser-active element and which are orientated with their concave surfaces towards the laser-active element 1 and d) an optical output coupler 3. The optical path length in the resonator is below 60 cm, advantageously below 30 cm, in particular below 15 cm, the focus length f21 and f22 of the concave mirrors 21 and 22 are below 3 cm, advantageously below 2 cm, in particular below or equal to 1,5 cm, such that a high repetition generation of femtosecond pulses is achievable.

Further the invention relates to a continuous tuneable high repetition rate femtosecond laser, the method of use thereof for high repetition generation of femtosecond pulses and a method for tuning thereof.

47 Claims, 8 Drawing Sheets

U.S. PATENT DOCUMENTS

| | | | | |
|---|---|---|---|---|
| 5,265,109 A | * | 11/1993 | Knox | 372/18 |
| 5,377,043 A | * | 12/1994 | Pelouch et al. | 359/326 |
| 5,383,198 A | | 1/1995 | Pelouch et al. | 372/18 |
| 5,553,093 A | * | 9/1996 | Ramaswamy et al. | 372/100 |
| 5,590,143 A | | 12/1996 | Takara et al. | 372/28 |
| 5,953,354 A | * | 9/1999 | Staver et al. | 372/107 |
| 5,956,354 A | * | 9/1999 | Yan | 372/18 |

OTHER PUBLICATIONS

Lin Xu et al: "Ultrabroadband Ring Oscillator for Sub–10–FS Pulse Generation" Optics Letters, US, Optical Society of America, Washington, vol. 21, No. 16 Aug. 15, 1996 pp. 1259–1261, XP000623776 ISSN: 0146–9592 Abstract.

Bartels A et al: "Femtosecond TI:sapphire ring laser with a 2–GHz repetition rate and its application in time–resolved spectroscopy" Optics Letters, Jul. 15, 1999, Opt. Soc. America, USA, vol. 24, No. 14, pp. 996–998, XP002150035 ISSN: 0146–9592—The Whole Document.

Article Entitled 60–FSEC Pulse Generation from a Self–Mode Locked TI: sapphire laser by D.E. Spence, P.N. Kean, and W. Sibbett, in Optics Letters 16, pp. 42–44., (1991).

Article Entitled "Chirped Multilayer Coatings for Broadband Dispersion Control in Femtosecondlasers" by R.Szipocs and K.Ferenczin Optics Letters 19, p. 201 and following pages, no month.

Article Entitled "Compact Dispersion–Compensating Geometry for Kerr–Lens Mode–Locked Femtosecond Lasers" by M. Ramaswamy–Paye and J.G. Fujimoto in Optics Letters 19, p. 1756 and following pages (1994). No month.

Article Entitled "10–FS Pulse Generation from a Unidirectional Kerr–Lens Mode–Locked TI:Sapphire Ring Laser" by A. Kasper and K.J. White in Optics Letters 2412 (1996). No month.

* cited by examiner

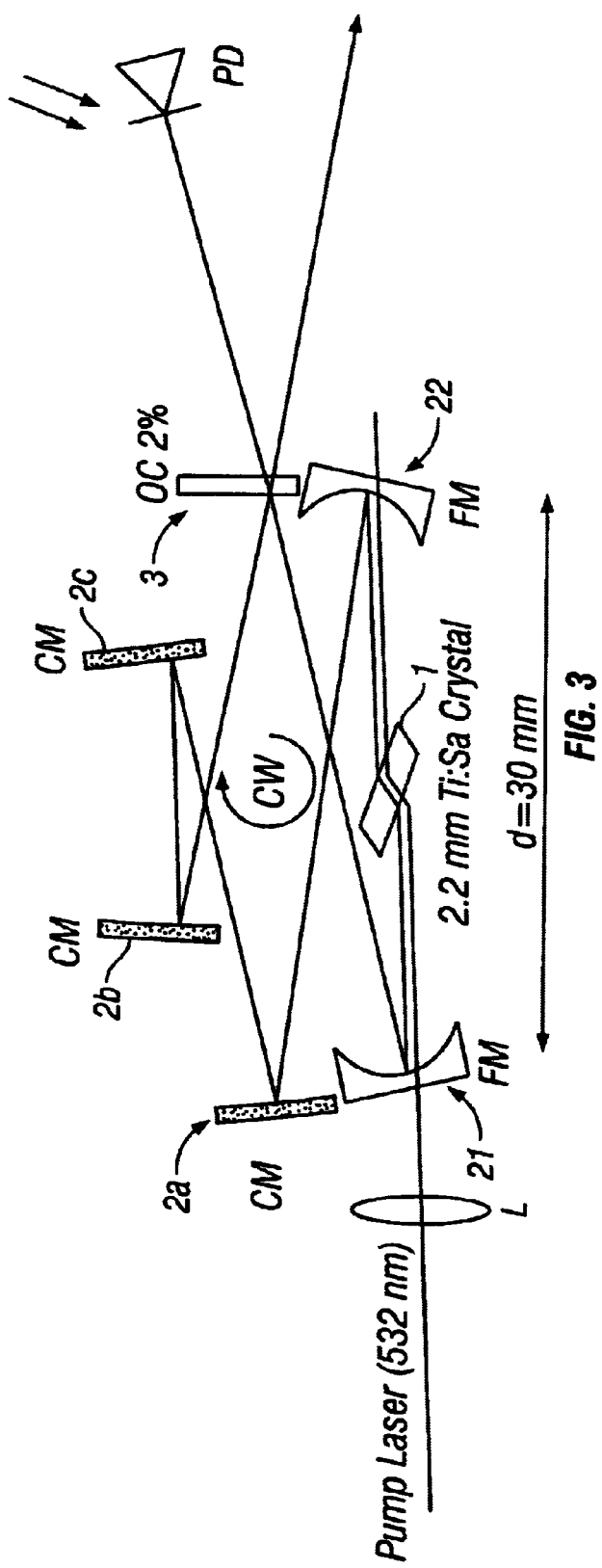
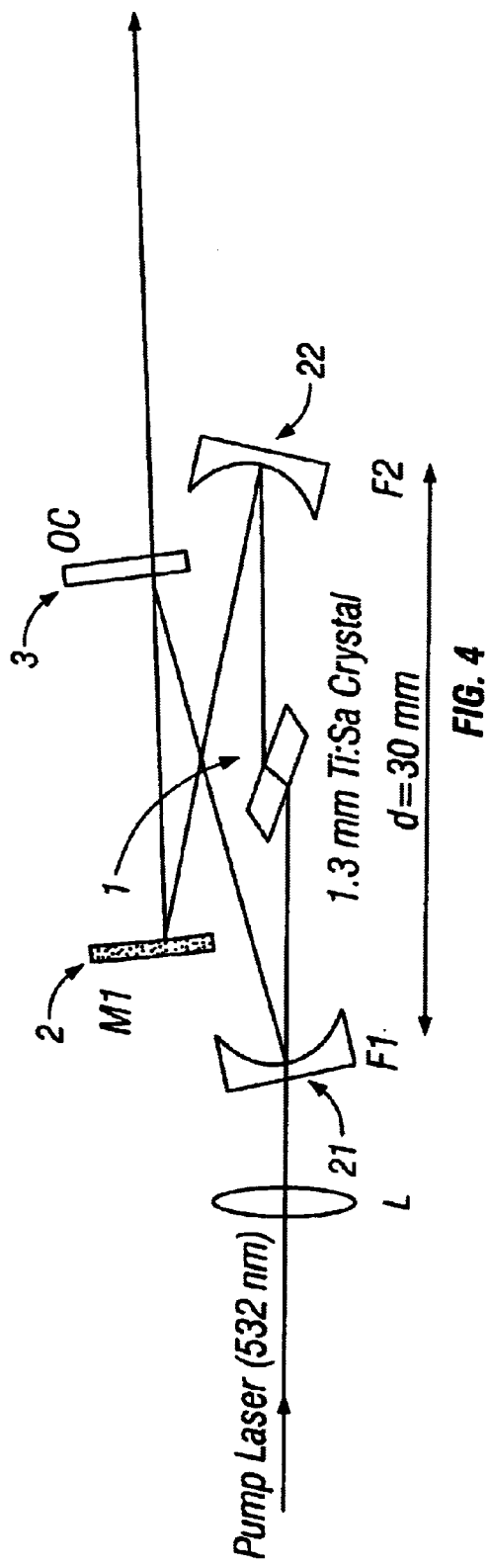
FIG. 3
FIG. 4

PASSIVELY MODE-COUPLED FEMTOSECOND LASER

The invention regards a passive mode-locked femtosecond laser having a ring resonator comprising a laser-active element, an optical output coupler and at least one mirroring element. Further the invention regards a femtosecond laser according the preamble part of claim 7 and still further a femtosecond laser according to the preamble part of claim 1. Further the invention regards a method for tuning a femtosecond laser. Also the invention regards a method of use of a femtosecond laser for generation of laser pulses with a duration below one picosecond.

With passive mode-locked femtosecond laser systems relatively high puls repetition rates in the range of several hundred MHz may be reached. These laser systems nevertheless cannot be referred to as being of high repetition rate as their repetition rates do not exceed 500 MHz. Due to extremely low pulse durations the pulses have a high peak intensity. Femtosecond lasers nowadays are successfully employed in the field of time-resolved spectroscopy, non-linear optics, multiple-photon-microscopy, micro-material engineering, optical frequency metrology and optical coherence-tomatography. Further in the future such lasers will also play a substantial role in the field of optical data communication.

Conventional passive mode-locked femtosecond laser systems rely on the use of titan doped sapphire crystals as laser-active elements. Upon optical excitation these develope a broad fluorescence spectrum in the range between 700 and 1000 nm. From this a gain profile of comparable range results, which means that Ti:Sapphire laser systems are suitable for generation of laser light in said range of wavelengths.

For generation of ultra-short laser pulses it must be observed that a laser pulse which is short in the time domain is correlated with a broad frequency spectrum. Because of this reason only laser elements with a broad gain profile are suitable for generation of ultra-short pulses.

All yet known passive mode-locked femtosecond laser systems with a solid state laser-active element (a CPM-dye laser is also passive mode-locked) rely on the concept of "Kerr-lens mode-locking". This non-linear optical effect results, by self-focussing of an intensive light beam in a non-linear medium, in a temporarily gain of a single pulse in the laser-active element during its round trip in the resonator, compared to a continuous operation of the laser.

The repetition rate of such a femtosecond laser system is determined by the duration of a round trip of the pulse circulating in the resonator.

The duration of the pulse circulating in the resonator is nevertheless not able to reach the theoretical limit, which is determined by the width of the gain profile of the laser-active elements. This is caused by the phenomenon of pulse-broadening, which is experienced by the laser pulse in particular in the laser-active element during its roundtrip in the resonator. This effect is due to the so-called positive group velocity dispersion of the laser-active elements and further optical components in the resonator. The consequence is, that the various portions of wavelengths of the circulating pulse pass the laser-active element within varying time periods, whereby the laser pulse passing through the laser-active element is broadened in its time duration.

The basic approach to compensate pulse broadening which is caused by the positive group velocity dispersion of the laser-active elements and further optical components of the resonator is the use of an arrangement in the laser resonator comprising a negative group velocity dispersion which at least compensates the pulse broadening which has been caused by the laser-active element and the further optical components.

Known in prior art is for instance an arrangement of two dispersive elements, for instance prisms in a laser resonator, a so-called prism compensator.

Basics of femtosecond laser systems which rely on "Kerr-lens mode-locked" Ti:Sapphire lasers with prism compensators can for instance be drawn from the publication of D. E. Spence, P. N. Kean, W. Sibbet in *Optics Letters* 16, page 42 and following pages (1991).

Recently as an alternative to said prisms or prism compensators dielectric mirrors have been developed which provide a negative group velocity dispersion GVD. This is achieved by a suitable sequence of dielectric layers on a substrate. The basic concept can be drawn from the publication of R. Szipöcs, K. Ferencz, Ch. Spielmann, F. Krausz in *Optics Letters* 19, page 201 and following pages (1994).

The use of such mirrors with negative group velocity dispersion GVD in a laser resonator offers a substantial advantage, i.e. in contrast to the above mentioned prisms- or prism compensators only a non-significant prolongation of the optical path in the resonator occurs.

A femtosecond laser system, which is based on said mirrors, may for instance be drawn from the publication of H. Stingl, Ch. Spielmann, R. Szipöcs, F. Krausz in *Conference on Lasers and Electro-Optics* 9, 1996 OSA Technical Digest Series (O.S.A., Washington D.C., 1996) page 66 and following.

Most of the Ti:Sapphire femtosecond laser systems relying on the phenomenon of "Kerr-lens mode-locking" comprise a Fabry-Perot-resonator, whose markable feature is a planar end mirror and which in particular has a folded configuration. In such kind of configuration elements belonging to a pulse compression such as prisms may be allocated simply in one arm of the resonator. The total length of such a resonator amounts typically in the range of 2 meters. Therefrom typical pulse repetition rates in the range of a few megahertz of normally below 100 MHz result. Such laser systems are not labelled as having a high-repetition rate.

From the above-mentioned publication of A. Stingl et. al. for instance a passive mode-locked Ti:Sapphire femtosecond laser system is known, which relies on a Fabry-Perot-resonator and which makes use of mirrors having a negative group velocity dispersion GVD.

Further from the U.S. Pat. No. 5,383,198 a self-starting passive mode-locked femtosecond laser system is known, having a prism compressor and a ring resonator and also from the U.S. Pat. No. 5,799,025 a self-starting passive mode-locked femtosecond laser system is known, having a prism compressor and a Fabry-Perot-resonator.

Due to the respective resonator geometries none of the mentioned laser systems allows to achieve pulse repetition rates of above 500 MHz and therefore these laser systems cannot be labelled as having high repetition rates.

An alternative approach may be drawn from the publication of M. Ramaswamy and J. G. Fujimoto in *Optics Letters* 19, page 1756 and following pages (1994) (see also U.S. Pat. No. 5,553,093). The approach is based on a simplified resonator configuration with making use of a specific prism compressor. Instead of a conventional resonator-internal pair of prisms a prism-shaped laser crystal and a prism-shaped output coupler is used. A specific geometry of the laser resonator configured as a Fabry-Perot-resonator and also the simplified prism compressor allows a shortening of the resonator length to about 30 cm so that a repetition rate of 1 GHz may be achieved.

Disadvantageous on this concept is, that in the outgoing beam the various in a laser pulse superimposed spectral components spread apart in a spatial direction perpendicular to the direction of the laser beam ("spatial chirp"), which at least complicates a practical use of such laser concept.

In fact the prism compressor being located inside the resonator enforces a minimal length of the resonator upon which it appears unlikely and even impossible that higher repetition rates than 1 GHz may be achieved.

A prism compressors causes, additionally to a negative group velocity dispersion, in some parts of the resonator a spatial split-up of the various spectral components of a laser pulse circulating in the resonator. A selection of wavelength may be established by use of a suitable, re-allocatable aperture in such area of a resonator, in which the spectral components are spatially split up. For such accomplished selection of wavelength the resonator facilitates laser activity. Thereby an ability of wavelength tuning is achieved. From the femtosecond laser system "Tsunami" of the Spectra Physics Company, Mountain View, Calif. such kind of arrangement is known for instance.

However, due to the respective resonator geometries further with none of the mentioned laser systems it is possible to achieve pulse repetition rates exceeding 500 MHz may be achieved and simultaneously the ability of wavelength tuning. Therefore, these laser systems cannot be labelled as being of high repetition rate.

It is therefore an object of the invention to provide a passive mode locked high repetition rate femtosecond laser by which laser pulses having a duration below one picosecond can be generated and which at the same time can be operated conveniently at repetition rates above 500 MHz, in particular above 1 GHz. A laser system according to a first variant of the invention shall in particular be used to generate such laser pulses.

Furthermore such laser system shall be adapted to generate therewith continuous tuneable laser pulses within the range of the gain profile of the laser-active medium and with a duration below one picosecond and which laser system is at the same time conveniently operable at repetition rates of above 500 MHz, in particular of above 1 GHz. A laser system according to a second variant of the invention shall in particular be used to generate such laser pulses.

In such laser systems the laser beam coupled out from the laser resonator shall not suffer from a spatial spreading of a spectral component perpendicular to the direction of the laser beam.

Furthermore a required occupied area of such a laser system shall be significantly reduced compared with laser systems of prior art, in particular compared with commercial available laser systems.

Additionally an especial suitable method for tuning a high repetition rate laser system shall be provided.

To solve such object the invention in a first variant proceeds from a passive mode locked femtosecond laser according to the preamble part of claim 7.

Such a femtosecond laser comprises a laser-active element which is located between the concave surfaces of two concave mirrors. The resonator may also comprise further mirroring or other optical elements, for instance planar mirrors. A respective ring resonator comprises additionally at least one dielectric mirror, i.e. one or a number of them. A dielectric mirror has a negative group velocity dispersion GVD. The negative group velocity dispersion GVD is adapted such that for a contiguous portion of the optical spectral range which is capable of being amplified by the laser-active element, the sum of the negative group velocity dispersion GVD of the dielectric mirror (or, if so, of the number of dielectric mirrors) and the positive group velocity dispersion GVD of the laser-active element (and, if so, of further optical elements), is negative. This means $$\sum_n GVD_n < 0$$

This is the basic assumption for a generation of femtosecond laser pulses. Further an optical output coupler is arranged in the resonator.

According to a first variant of the invention such a resonator is construed such that the optical path length in the resonator is below 60 cm, in particular below 30 cm, in particular below 15 cm. From these optical path length pulse repetition rates result which conveniently exceed 500 MHz, which in particular exceed 1 GHz and which in particular exceed 2 GHz. Furthermore the focus length of the concave mirrors, which are spatial adjacent next to the laser-active element are elected to be below 3 cm, in particular below 2 cm, in particular below or equal to 1,5 cm elected. With such a laser a high repetition rate pulsed laser operation with femtosecond pulses is achievable so that said femtosecond laser is a high repetition rate femtosecond laser.

A passive mode locked high repetition rate femtosecond laser comprising these features provides a series of substantial advantages. Making use of a ring resonator instead of a linear Fabry-Perot resonator allows a significant reduction of the resonator length, which is a basic assumption to be able to achieve high repetition rates.

Making use of dielectric mirrors with negative group velocity dispersion GVD instead of conventional prism- or grating-compressors allows additionally to reduce the length of the ring resonator. Thereby it is possible to reduce the geometric length of the resonator by more than 10 cm, which in turn is accompanied by an increase of the pulse repetition rate.

Furthermore the invention has arisen from the idea that making use of concave mirrors, which are especially arranged adjacent next to the laser-active element and whose focus length amount within the mentioned predetermined range according to the characterising part of claim 7, allows to achieve a beam diameter of a resonator mode in the laser-active element, which is comparable to the evolution of the resonator mode of a conventional linear Fabry-Perot- or also of a ring-resonator each having a significant larger geometric length. Such a small diameter of the resonator mode in the laser-active element, in particular of a beam waist in the laser-active element is a basic condition for an efficient generation of laser pulses. In particular this is a basic condition for both of the mentioned fundamental effects, which are responsible for the generation of ultra short pulses in a passive mode locked laser system. These fundamental effects are the so-called self-phase-modulation SPM and the so-called self-amplitude-modulation SAM in a non-linear medium, in particular also in a laser-active medium such as the laser-active element in a resonator. Both effects in turn are due to the so called Kerr-effect. The dependence of the index of refraction from the local light intensity is referred to as Kerr-effect.

The self-phase-modulation SPM occurring in the laser crystal is characterised by the quantity $\Phi$ and is substantial for the minimal achievable pulse length $\tau$. The relation holds:

$$\tau \propto \frac{|D|}{\Phi E_p}$$

Therein D is the group velocity dispersion GVD summarised for all optical elements in the resonator:

$$D = \sum_n GVD_n$$

$E_p$ refers to the pulse energy.

The magnitude of the self-phase-modulation $\Phi$ is essentially proportional to the square of the beam radius w in the laser crystal. To aim for a preferably high intensity in the laser crystal it is therefore inevitable to achieve a preferably small beam diameter of the resonator mode in the laser-active element, in particular a beam waist with preferably small diameter in the laser-active element. This specific effect is achieved according to the invention by making use of a convex mirror having a focus length adapted to the above mentioned maximal resonator length.

Thereby the further advantage is achieved, that the laser beam coupled out of the laser resonator is free from a spatial spreading of the spectral components perpendicular to the beam direction.

Also the required occupied area of the proposed laser system is significantly reduced compared to known laser systems of prior art, in particular to commercially available laser systems, which is achieved by the skilful choice of resonator geometry.

Further to solve the object, the invention in a second variant proceeds from a passive mode locked femtosecond laser according to the preamble part of claim 1. This in particular regards the generation of continuously tuneable laser pulses within the gain profile of a laser-active medium.

Such a femtosecond laser according to the second variant of the invention comprises like the first variant of the invention, a laser-active element, which is located between the concave surfaces of two concave mirrors. Additionally to the further features of the ring resonator as mentioned with the first variant (at least a dielectric mirror, two concave mirrors an output coupler), the second variant comprises a self-focussing element and a prismatic element.

According to the second variant of the invention said resonator is configured such that the optical path length in the resonator is smaller than 60 cm, advantageously smaller than 30 cm, in particular smaller than 15 cm. From these optical path lengths pulse repetition rates result, which conveniently exceed 500 MHz, in particular exceed 1 GHz, which are in particular higher than 2 GHz. Further the focus length of the concave mirrors, which are arranged adjacent next to the laser-active element, are selected to be below 3 cm, advantageously below 2 cm, in particular below or equal to 1,5 cm. Furthermore, at least the dielectric mirror or the output coupler or any further mirror is tiltable such that, due to a tilted angle, in correlation with the spatial dispersion of the prismatic elements, a wavelength is advantageously continuously tuneable for which wavelength the resonator allows laser operation.

With such a laser also a high repetition rate laser pulsed operation of femtosecond pulses is attainable so that such laser is a high repetition rate femtosecond laser. Furthermore, the proposed high repetition rate femtosecond laser is continuously tuneable. The resonator comprises a prismatic element, which functions to effectuate a spatial separation of different spectral components of the light circulating in the resonator. According to its second variant the invention arises from the idea, that in correlation with a mirror tiltable upon an axis perpendicular to the plane in which the spectral components are separated, a wavelength is selectable by said tilt such that for said wavelength the highest overall gain is supplied in the resonator. This wavelength thereon is the operating wavelength of the laser.

Although a tuneability may be achieved with most femtosecond laser systems only with some expenditure and will mostly as a general rule be achieved only to the expense of pulse duration and repetition rate (e.g. by making use of a prism compressor, which is room-expensive and supports significantly the broadening of pulses) it is nevertheless in particular advantageous to provide a wavelength-tuneable femtosecond laser. This is because such laser allows to adapt the optical wavelength within the range of the underlying gain profile to the requirements of a desired application. This has been succeeded with the femtosecond laser according to the second variant of the invention in an especial elegant and simple way. This is because the proposed continuous tuneable high repetition femtosecond laser comprises also the advantages of the laser according to the first variant of the invention. In particular the ability of high repetition, compactness, tuneability and femtosecond operation mode have been realised in combination.

Thereby it is advantageous, according to a further developed configuration of the in particular second variant of the invention, that the laser-active element also functions as a self-focussing element, i.e. the laser-active element and the self-focussing element are identical. For instance this is the case for titan sapphire lasers.

Advantageously the resonator is, in correlation with the non-linear element, configured such that pulsed laser operation allows a higher degree of energy efficiency from the laser-active element than in a continuous operation mode.

The prismatic element is advantageously configured such that an optical beam incident on a prism surface under the condition of minimal deflection, is incident in the Brewster angle with a wavelength amplifiable by the laser-active medium and also emerges under such angle from the output surface.

Optional such prismatic element may be also configured such that an optical beam incident on the prism surface with the Brewster angle with a wavelength amplifiable by the laser-active medium emerges from the output surface essentially in a right angle. Therefore an anti-reflex layer is applied to the output surface, the anti-reflex layer being adapted for those wavelengths amplifiable by the laser-active medium. The above mentioned further developed configurations of the invention may be in particular applied to the second variant of the invention and also to the first variant of the invention.

In particular it is to be observed upon the further developed configurations of the invention according to its first variant and also to its second variant that all further parameters of the resonator are selected such that an optical stable resonator is being configured.

It has been shown that an especial advantageous laser system is available if the focus length of the concave mirrors which are spatial adjacent next to the laser-active element are elected essentially in equal way. This is enabled mainly by an essentially axial symmetric formation of the laser resonator.

In a further preferred development of the laser system according to the invention the geometric distance of the concave mirrors to each other is selected smaller than the sum of the focus lengths of the concave mirrors. By solely varying the distance d of the concave mirrors to each other while keeping the total remaining resonator geometry constant one is able to determine an interval of this distance within which a stable operation of the laser resonator is possible. Such interval is arranged essentially symmetric to a distance of the concave mirrors which distance corresponds to accurately the sum of the focus length of the concave mirrors.

It has become apparent that an especial stable operation in a passive mode locked condition is possible if the distance d of the concave mirrors to each other is selected smaller than the sum of the focus length of the concave mirrors. A positive effect on the evolution of the Kerr-effects substantial for passive mode locking results.

This effect can even be enforced if the laser-active element is arranged between the adjacent concave mirrors not in a symmetric but as defined according to the features of claim 10. If such arrangement of the laser-active element is realised a decrease of the beam diameter in the laser crystal along with an increasing instantaneous power of the pulse results. This effect is also based on the Kerr-effect and is referred to as a formation of a "smooth aperture" if it is in combination with a stronger focussing of the pump-laser beam as compared to the resonator mode. It also supports a stable passive mode locked pulsed operation.

In a further developed configuration of the laser system according to the invention the distance d between the concave mirrors is selected larger than the sum of the focus length of the concave mirrors. In this case the occurrence of a "smooth aperture" of the laser-active element may not be observed. However, instead of this a so-called "hard aperture" may be located in the ring resonator, which for instance may be configured as a ring aperture. In particular such a hard aperture is provided at such location in the resonator on which the resonator mode has a comparingly small diameter with a comparingly large instantaneous power.

It has become apparent that a laser system according to the invention is advantageously used with a titan doped sapphire crystal as a laser-active element. Nevertheless further also the use of other laser-active elements is possible which comprise a gain spectrum broad enough to theoretically enable the generation of femtosecond laser pulses. In particular the laser-active elements of claim 12 are to be mentioned in this context.

To provide optical pumping to the laser-active element for instance an argon ion laser may be used which in particular is tuned to the maximum absorption of the laser-active element.

In an especially advantageous developed configuration of the laser system according to the invention a solid state laser system is employed as a pump laser whose wavelength spectrum is selected to be adapted to the absorption spectrum of the laser-active element. In particular the frequency doubled solid state laser systems as mentioned in claim 13 are suitable in this context. The use of a naturally low-noise solid state laser system as a pump laser effectuates in an advantageous way the fluctuation of intensity of the pulsed laser radiation generated from the inventive laser system.

Further it has become apparent that to support a stable passive mode located pulsed operation with a comparingly well degree of efficiency of the inventive laser system the degree of outcoupling T of the optical output coupler should be below 5%, advantageously below 3%, in particular below or equal to 2%. Higher degrees of outcoupling T would increase the quantum efficiency of the laser system, smaller degrees of outcoupling T would stabilise the inventive laser system in the passive mode locked pulsed operation mode.

The output coupler is advantageously configured as a partial-reflecting, in particular, as a dielectric mirror.

Alternatively also other possibilities for outcoupling may be realised, for instance by outcoupling of an evanecent wave which results from an inner total reflection of a resonator mode on an interface. In such a configuration a degree of outcoupling may be varied freely within specific bounds.

In a further developed configuration of the inventive laser system all mirrors of the ring resonator have a negative group velocity dispersion GVD. Respectively, depending on the dimension of the positive group velocity dispersion GVD due to the laser-active element, also only a single mirror with negative group velocity dispersion GVD may be employed in the laser resonator. In particular also the outcoupling mirror may have a negative group velocity dispersion GVD.

In a particular advantageous developed configuration of the inventive laser system the ring resonator is construed, such that the resonator is compensated for astigmatism. This may be realised by a suitable choice of the resonator geometry, in particular of the angle of reflection of the concave mirrors. In particular a beam waist with circular cross-section in the laser-active element and/or a beam coupled out from the laser resonator having a circular cross-section may be realised in this way. It is especially advantageous for compensation of astigmatism, when the optical length of the ring resonator is selected to exceed 1 cm, advantageously to exceed 2 cm and is selected in particular above 3,5 cm. This is because at smaller wavelengths extremely high angles of reflection at the concave mirrors are to be achieved for compensation of the astigmatism of the laser-active element.

Particular practical advantages by making use of the inventive laser system result when all elements of the ring resonator are arranged mechanically on a common mounting platform. In particular a mounting of the optical components in a monolithic block is possible.

Particular advantages of the inventive laser system thus are based on its high pulse repetition rate which may extend between 500 MHz and about 10 GHz. Further advantageous is its significant reduced demand for occupied expanse, i.e. occupied space, compared to conventional laser systems. Saving of costy room on optical tables is accomplished. Finally the signal to noise ratio relating fluctuation of intensity is improved by more than a factor of 10 compared to conventional, in particular gas laser pumped laser systems. Further the advantage is achieved, that the laser beam coupled out of the resonator does not show any spreading of spectral components perpendicular to the beam direction. Even further a variant of the invention allows for the ability of continuous tuning of the inventive laser system.

Figure 2:
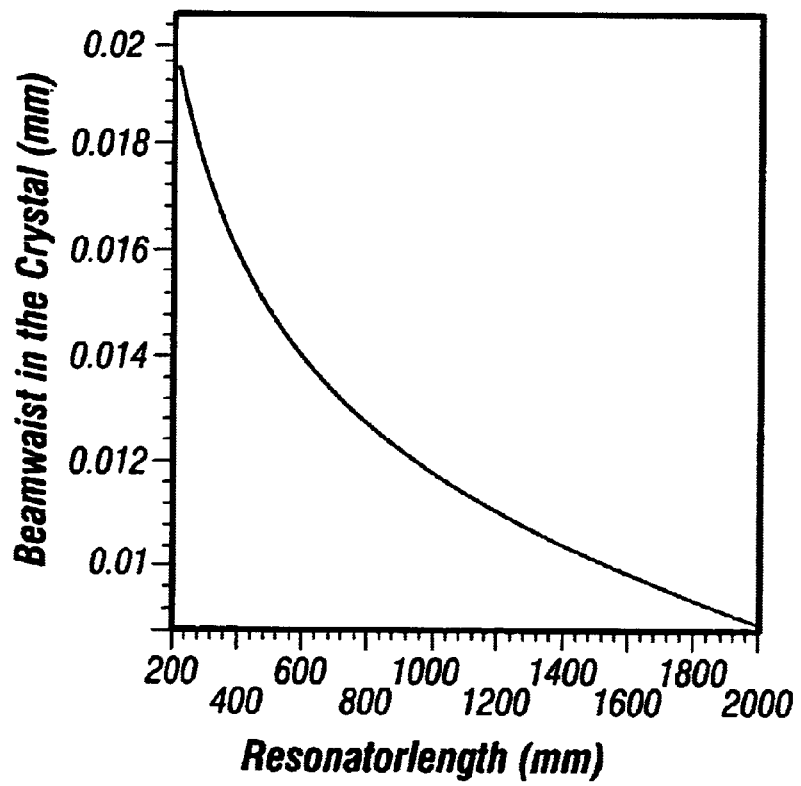
Figure 5:
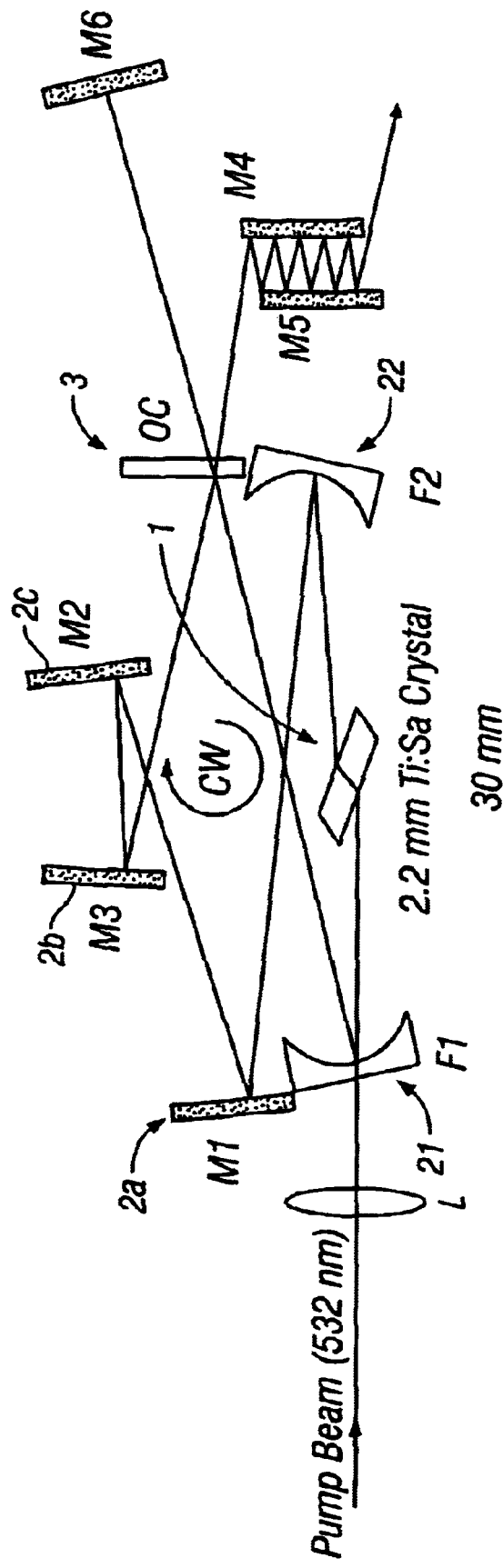
Figure 6:
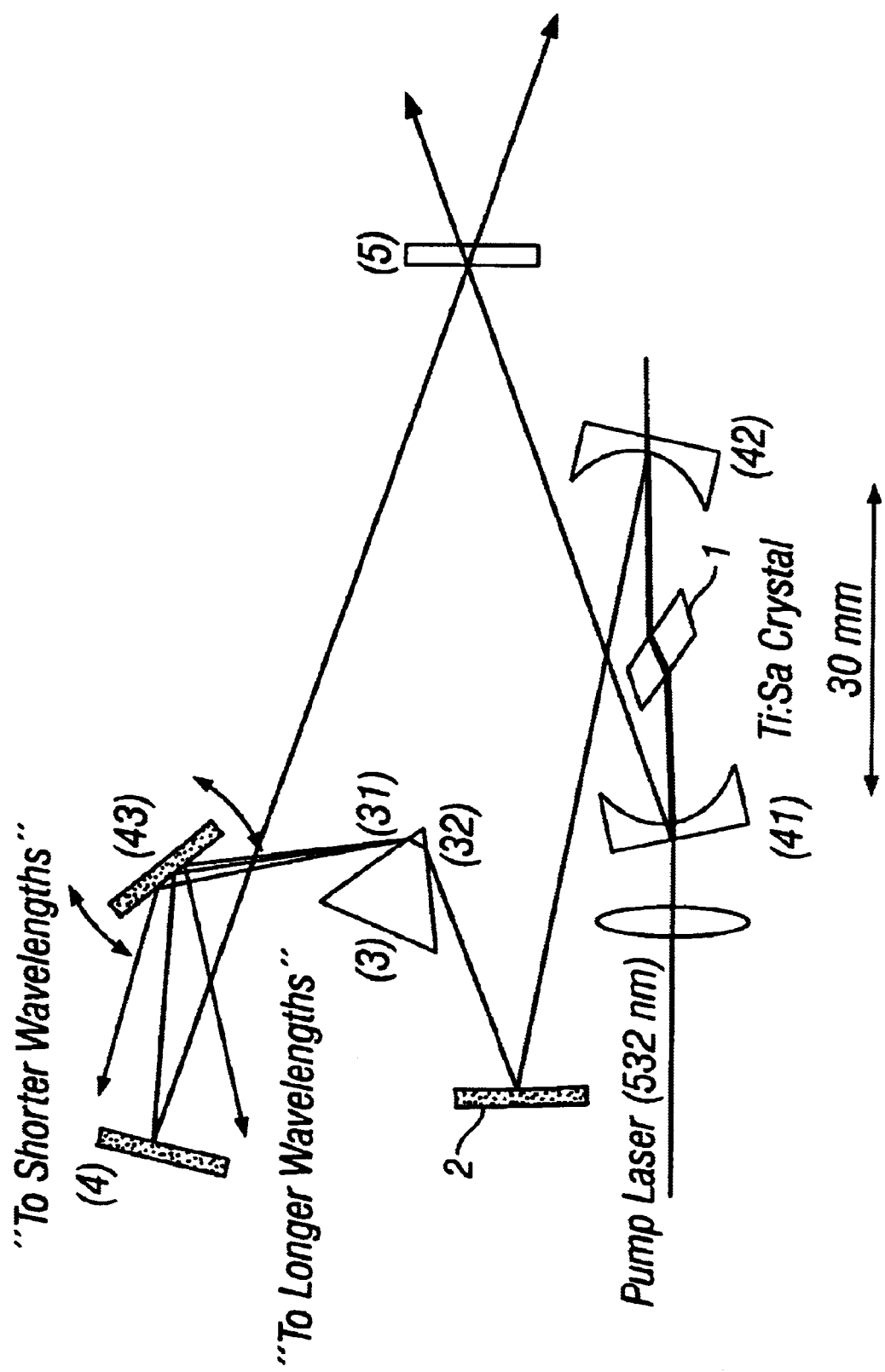
Figure 7:
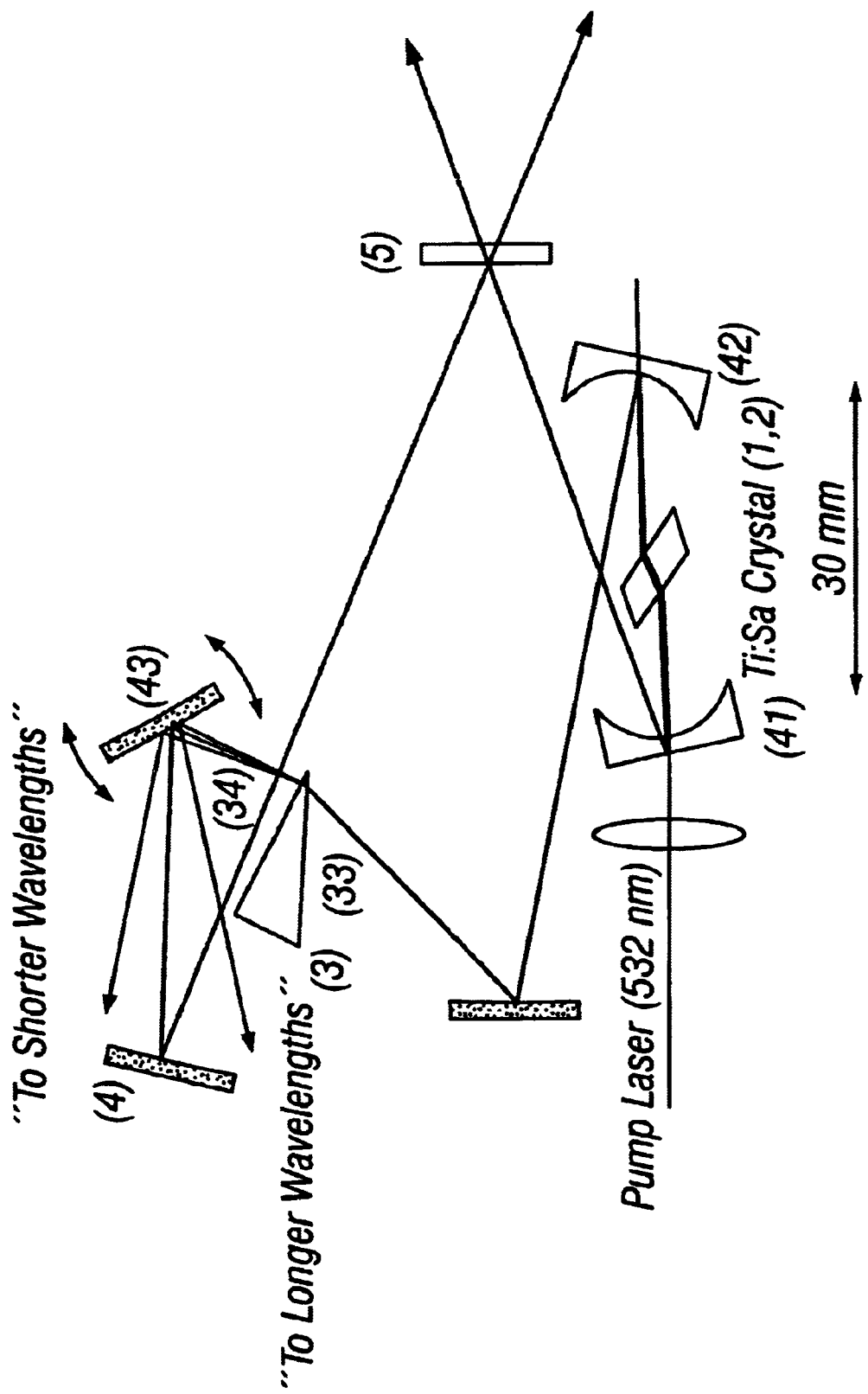
Figure 8:
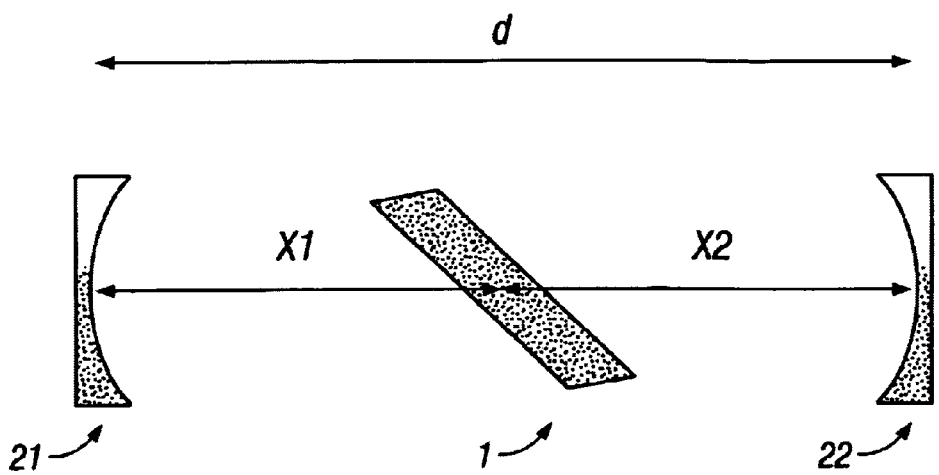
Figure 9:
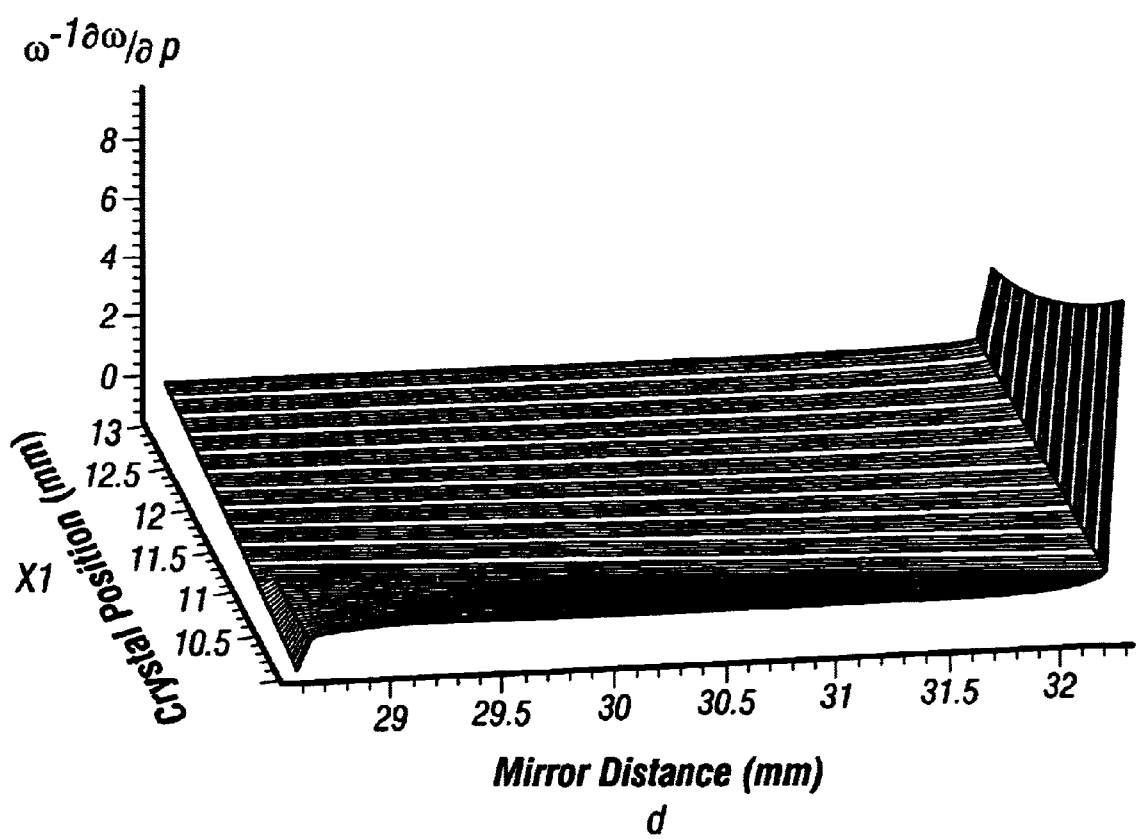
Figure 10:
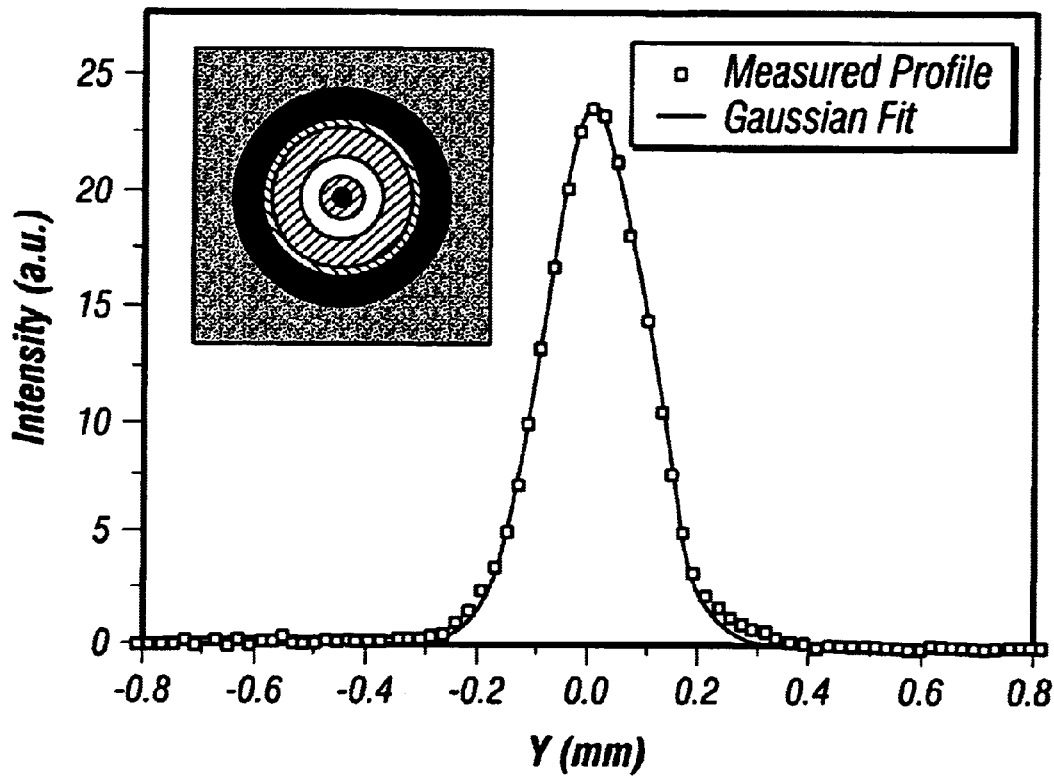
Figure 11:
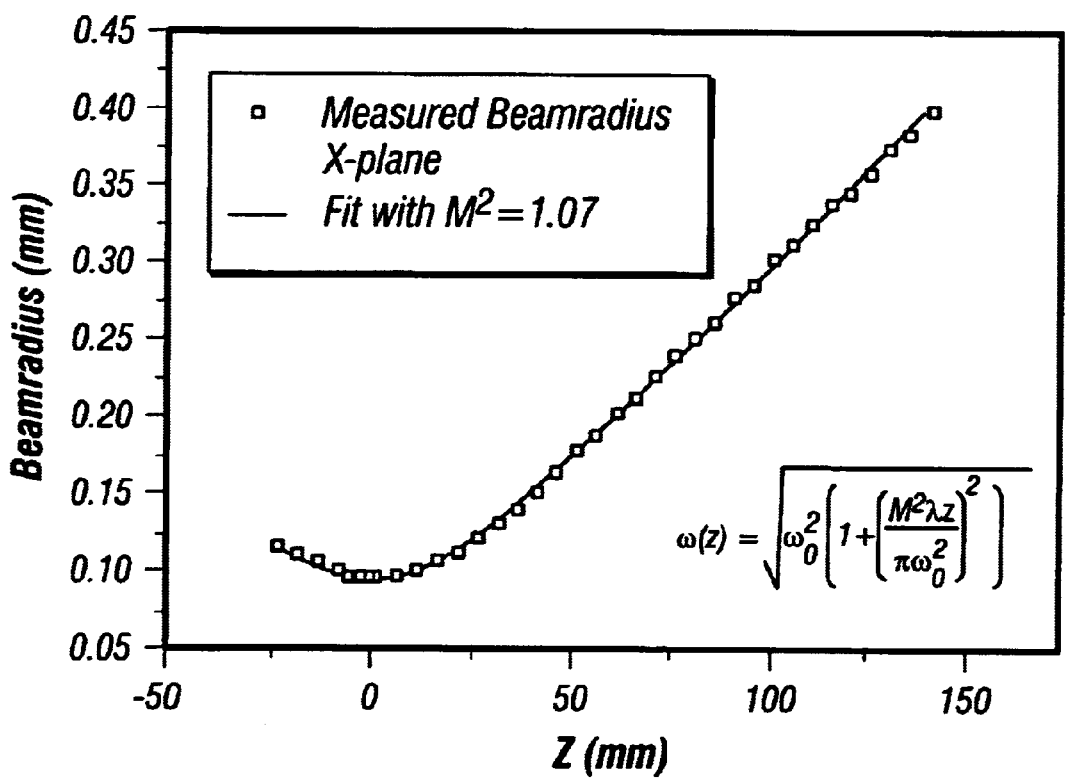
Figure 12:
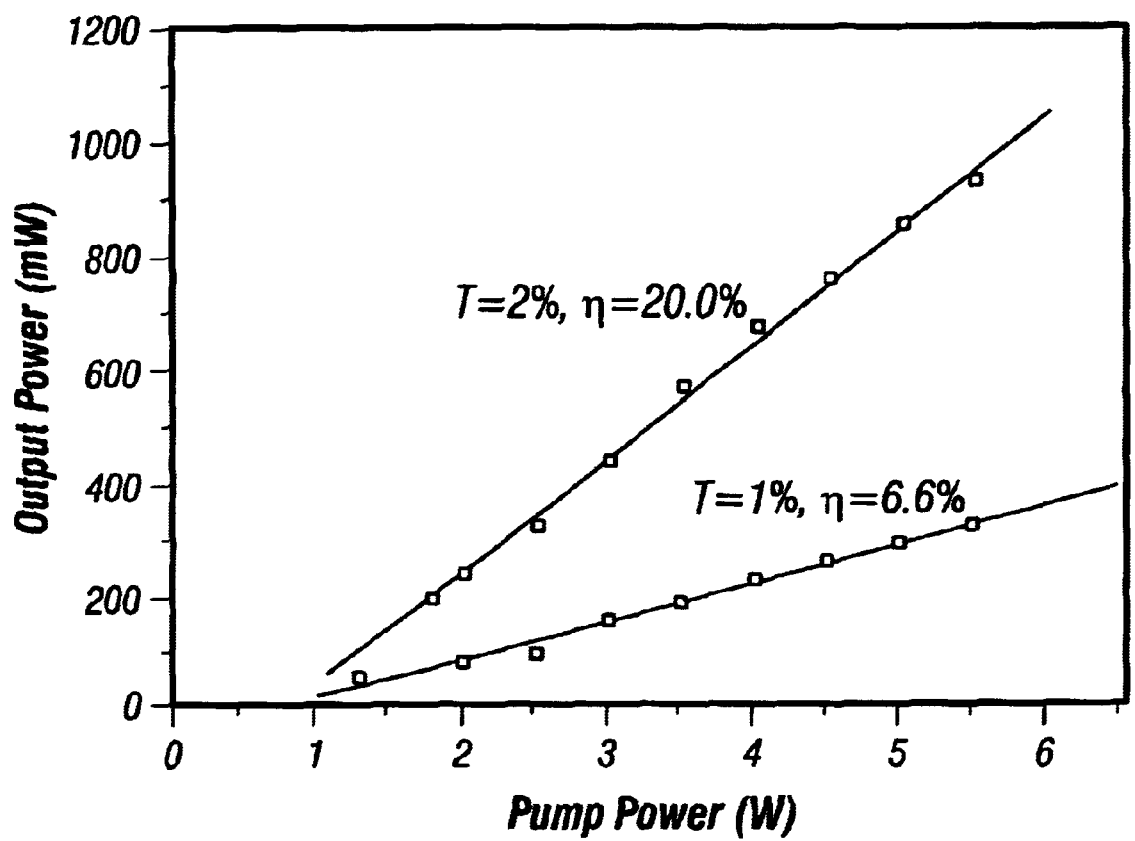

Further features and advantages of the inventive laser system are illustrated along with the following preferred embodiments, which are not meant to be restrictive and which are illustrated along with the drawing. In the drawing it is shown in:

FIG. 1 the evolution of the radius w of the beam waist in a resonator of conventional length compared to a conventional shortened resonator which is adapted for a pulse repetition rate of 1 GHz, FIG. 2 the evolution of the radius w of the beam waist in a laser-active and simultaneously self-focussing element as a function of the resonator length for a ring resonator the geometry of which is optimised to a resonator length of two meters, FIG. 3 a schematic view of a laser system according to a first variant of the invention in a top view, in which the ring resonator is established with two concave mirrors and four planar mirrors, FIG. 4 a schematic illustration of a laser system according to a first variant of the invention whose ring resonator is established with two concave mirrors and two planar mirrors in a top view and FIG. 5 a further development of the laser system shown in FIG. 3 for establishing of a self start function in a predetermined direction of circulation, FIG. 6 a schematic view of a wavelength tuneable laser system according to a second variant of the invention comprising a Brewster prism, FIG. 7 a schematic view of a wavelength tuneable laser system according to a second variant of the invention comprising half a Brewster prism, FIG. 8 a schematic illustration of the relative position X1, X2, d of concave mirrors and a laser-active self-focussing element, FIG. 9 the progress of stability of an inventive laser whose resonator is adapted for a pulse repetition rate of 1 GHz as a function of the mirror distance d, FIG. 10 a measured beam cross section of a pulsed laser beam coupled out from the inventive laser system also comprising a Gauβ function fitted thereto and as well in the insert an evolution of intensity measured perpendicular to the beam direction with a CCD camera, FIG. 11 the evolution of a beam radius w behind the output coupler mirror in the plane of the laser resonator as a function of the distance from the output coupler mirror in a laser system according to the invention, FIG. 12 the evolution of the output power as a function of the pump power for an inventive laser system having a resonator in pulsed operation with a repetition rate of 1 GHz for two varying degrees of outcoupling T.

FIG. 1 shows the progression of a resonator mode in a conventional prolongated resonator having a resonator length of two meters as a function of the position of the beam axis in the resonator as it is in the region of the laser crystal. As a comparison the progression of a resonator mode in a conventional resonator is shown whose length was optimized to a pulse repetition rate of 1 GHz, however, without adapting the geometry of the resonator. The inset points out that a naive shortening of the resonator length of a conventional prolongated resonator may lead in principle to an increase of the pulse repetition rate, however, simultaneously (and unavoidably) to an increase of the beam waist diameter of the resonator mode in the laser-active element. This effectuates the Kerr-effect in a negative way, which is elementar for the generation of pulses, in particular, the formation of a Kerr-lense in the laser-active element is effected in a negative way. A simple truncation of the resonator length of a conventional elongated resonator to a length necessary for high pulse repetition rates will therefore in general lead to the result that no pulse operation of the laser may be achieved at all or at least no stable pulse operation may be achieved. Therefore, modifications of the resonator geometry are indispensable for transition to higher pulse repetition rates.

The above issue is once more clarified in a different way in FIG. 2. Namely it is impossible to shorten the resonator length of an already existing ring resonator with lower pulse repetition rate to a respective shorter length to increase the pulse repetition rate. The radius of the beam waist in such a conventional ring resonator of prior art is illustrated in the laser-active/self-focussing element 1, 2 as a function of the total length of the ring resonator. A strong increase of the beam waist radius is recognised when the total length of the resonator is shortened to a length of about 30 cm as necessary for a pulse repetition rate of 1 GHz. Such an increase of the beam waist radius effectuates in an extremely disadvantageous way the progression of the Kerr-effect in the laser-active element and therefore a stable passive mode locked operation of the laser system.

To achieve higher pulse repetition rates use is made of reduced focus lengths f41, f42 and accordingly f21, f22, of the concave mirrors 41, 42 and accordingly 21, 22, as compared to known laser systems of prior art, and as defined according to claim 1 or claim 7 of the laser system according to the second and first variant of the invention which is of decisive relevance.

A preferred embodiment of the laser system according to a first variant of the invention can be drawn from FIG. 3 as follows.

FIG. 3 illustrates a schematic view of a laser system according to a first variant of the invention in a top view. The laser resonator is established by the concave mirror 21 and 22 as well as the planar mirror 2 and the planar output coupler 3. The laser-active element 1 is of a titan doped saphire crystal having an absorption coefficient of A=5 per cm at the pump wavelength of 532 nm. The surfaces of the crystal as extending in the optical path are planar-parallel and optical polished; their distance amounts to 2,2 mm. The focus length of the concave mirror 21 and 22 as in use amounts to 15 mm. The distance d between the concave mirrors is smaller or equal to 30 mm. The titan-saphire crystal is located approximately midway between the concave mirrors, in particular according to the features of claim 4. A frequency doubled Nd:YAG-laser having a wavelength of 532 nm is used as a pump laser. By a lense L this is focussed beyond the concave mirror 21 into the laser-active element 1. Thereby the resonator mode and the pump laser beam are superimposed in the laser-active elements as accurate as possible. The angle enclosed between the beams reflected by the concave mirrors 21 and 22 amount between 15° and 25°, in particular 18°. The total length of the resonator is selected such that a pulse repetition rate of 1 GHz arises. The planar mirror CM wears a high reflective dielectric coating having a negative group velocity dispersion. The also planar output coupler OC is construed as a partial-reflective dielectric mirror. Its reflectivity amounts between 95 and 99%, in particular 98%. Advantageously, however not necessarily, behind the output coupler OC a photodiode PD is located. Such a photodiode PD allows, by an intensity measurement, to verify a pulsed operation of the illustrated laser system in a most simple way, namely by failure of appearance of a light intensity on the photodiode. FIG. 4 shows a laser according to a first variant of the invention as already illustrated in FIG. 3. Compared therewith, this embodiment comprises two mirrors 4 less. Such a formation is in particular advantageous to obtain high pulse repetition rates as the reduced number of mirrors allows to achieve a shortened total resonator length.

A laser system according to the invention may therefore also be realized with a smaller number of mirrors compared to the number of mirrors in the system shown in FIG. 3. Such a system like in FIG. 4 relies only on making use of only two concave mirrors and two planar mirrors. In most parts it corresponds to the system shown in FIG. 3. However, only the planar mirror labelled as N1 is implemented as a dielectric mirror 2 having a negative group velocity dispersion GVD. All further mirrors wear a conventional dielectric coating which is implemented on the concave mirrors as a high reflective coating as well as on the output coupler labelled as OC with a transmission T of approximately 2%.

Due to the fact that only one mirror having a negative group velocity dispersion GVD for compensating the positive group velocity dispersion of the laser-active element is available it is advantageous to keep the positive group velocity dispersion of the laser-active element as low as possible. This can for instance be realized by a reduced length of the laser-active element. This has been achieved in the laser system shown in FIG. 4 according to a first variant of the invention wherein the distance between the planar and parallel surfaces of the titan saphire crystal amounts to only 1,3 mm in distinction to the example shown in FIG. 3. The surfaces of the titan saphire crystal are inclined to the optical axis with the brewster angle. To achieve a comparable effective absorption of the pump light within the reduced length of the laser-active element 1 it is advantageous to dope the laser-active element 1 with a higher concentration of laser-active ions or atoms. In the case illustrated the titan doping has been increased such that the absorption coefficient of the laser-active element 1 rises to an amount of A=6 per cm at the pump wavelength. In this way a comparable absorption of the pump light in the laser-active element can be achieved comparable to those in the laser system shown in FIG. 3.

FIG. 5 illustrates an embodiment of an advantageous development of a femtosecond laser according to a first variant of the invention—for instance being constitutive on the embodiment of a laser system according to a first variant of the invention as illustrated in FIG. 3. This regards predominantly the additional attached planar mirror M6. As long the laser system according to the invention acts in the continuous operation mode two counter propagating partial beams circulate in the ring resonator. Thereby, two partial beams are coupled out of the out-couple mirror 3. The planar mirror M6 serves to reflect one of these partial beams back into the resonator. This has the effect, that the intensity of the circulating partial beam circulating in the resonator in clockwise direction is increased in the laser-active element 1. Therefore, this partial beam is favoured upon laser stimulation and experiences a stronger Kerr-lens formation in the laser-active element so that a pulsed operation of the inventive laser system with a pulse circulating in the ring resonator in clockwise direction is favoured. The mirror M6 therefore serves to predetermine the direction of circulation of the laser pulse in the ring resonator.

Additionally, the planar mirror M6 effectuates that the femtosecond laser according to a first variant of the invention experiences a spontaneous transition from an initial continuos laser operation into a pulsed operation. This effect may even be fortified by applying a periodical perturbation to the mirror M6, for instance by a periodical vibration.

With a femtosecond laser according to the invention as described in the embodiments of FIGS. 3, 4 and 5 the ring resonator thereof has been optimized to a pulse repetition rate of 1 GHz according to the invention. Thereby, it became possible to achieve an average laser power of 100 Milliwatt (mW) with the pump power of 1,7 Watt whereby the generated pulses have a duration of approximately 50 femtoseconds. For an inventive femtosecond laser/laser system, whose ring resonator has been optimized to a pulse repetition rate of 2 GHz it was possible to generate pulses of approximately 25 femtoseconds duration. A slight dependence of the pulse duration X on the intensity of the pump laser became apparent. At an average pump power of 2,5 Watt the average pulse duration $\tau$ amounts to 29 femtoseconds; at an average pump power of 5,5 Watt the average pulse duration $\tau$ decreases to 25 femtoseconds. A measurement of the wavelength spectrum of the laser during pulsed operation revealed that the width of the measured wavelength distribution agreed well with high accuracy with the measured pulse duration. This means that the pulse duration is limited primarily by dispersive effects of third order.

With the transmission of the out coupled beam through the substrate of the out couple mirror 3, which is typically of the thickness of 5 mm, also a positive group velocity dispersion occurs, which results in an extension of the pulse duration. Such extension of the pulse duration can be compensated by multiple reflection at dielectric mirrors having a negative group velocity dispersion. This is realized with the mirrors M4 and M5 as shown in FIG. 5. For the use of a femtosecond laser/laser system according to the invention, in particular for a commercial application, a mounting of the elements of the laser system, in particular the mirrors 2, 3 being part of the ring resonator as well as the laser-active element 1 and all of the thereto belonging adjustment means is advantageous performed on a common mounting platform. In particular the elements of the laser system may be integrated advantageously in a monolithic metal block, which for example may consist of aluminium or also of invar.

FIG. 6 shows a laser resonator of a femtosecond laser according to a second variant of the invention. Thereto, the embodiment shown in FIG. 6 is supplied with an additional means for tuning the wavelength as defined in claim 1. A preferred embodiment of the resonator shown here may be established for instance by establishing the embodiment shown in FIG. 4 (according to a first variant of the invention—claim 7). The brewster-prism 3 according to claim 4 functions as an especial dispersive element and effectuates a spatial separation of distinct wavelengths. By tilting a resonator mirror, in particular of a mirror 43 next neighboured to the prism, the wavelength may be selected for which the resonator shall have the least losses. This is to be the operation wavelength of the laser. Waves of shorter or longer wavelength are not capable to be amplified in the resonator and get lost only after a few circulations.

FIG. 7 illustrates a further embodiment of the laser resonator of a femtosecond laser according to a second variant of the invention. Also the latter, establishing the embodiment shown in FIG. 3, may be supplied with an additional means for tuning the wavelength according to claim 1. Here the resonator comprises, in distinction to the embodiment shown in FIG. 6, as a special dispersive element half a Brewster-prism according to claim 5 whose adjacent leg 34 supports an antireflex-coating for the laser wavelength. This is an especially advantageous embodiment as by this way only half of the positive GVD compared to FIG. 6, which is to be compensated by the dispersive mirror, is introduced into the resonator.

FIG. 8 serves to define the distance d between the concave mirrors 21, 22 as well as the distances X1 and X2 of the laser-active element from the concave mirrors 21, 22.

FIG. 9 depicts the region of stability of a laser system according to a first and a second variant of the invention having a 1 GHz resonator and concave mirrors 21 and 22 with a focus—length of 15 mm. The variation of the beam waist radius w in a laser-active/self-focussing element is outlined as a function of the average power P of the resonator mode. Thereby w is the beam waist radius in the laser-active element 1 and P is the average power of the resonator. The portrayal is performed in a two-dimensional way as a function of the mirror distance d on the one hand and the crystal position X1 on the other hand. A negative amount of the value $w^{-1}\partial w/\partial P$ is advantageous to support the occurrence of a smooth aperture due to the Kerr-effect in the laser-active element. It is recognized, that such circumstance applies if the mirror distance d is selected smaller than the sum of the focus lengths f21 and f22 of the concave mirrors 21 and 22. It is further recognized that this effect is amplified if the distance X1 is selected smaller than half of the sum of the focus length.

The outstanding beam quality of the inventive femtosecond laser/laser system becomes clear from FIG. 10. The figure shows the distribution of the intensity perpendicular to the resonator plane measured with a CCD camera. The full line is a numerical Gauβ-function fitted to the measured values. The outstanding consistency is recognized. The inset shows the distribution of intensity of the total beam cross section measured by a CCD camera. The measured intensity is correlated with luminance values. It is recognized the almost circular beam profile of a $TEM_{00}$ mode.

The superb/beam quality of the inventive femtosecond laser shows also up in the envelovement of the beam radius w as a function of the distance from the outcouple mirror. This is illustrated in FIG. 11. The dots represent the experimentally measured values, the full line images the envelovement as predicted by theory, whereby the formalism of the real beam propagation has been used by taking into account the so called $M^2$-factor. A superb consistency of theory and experiment is recognized for a $M^2$-factor of 1,07, which is very tight to the theoretical optimum of $M^2=1,0$.

FIG. 12 shows the generated pulsed laser power as a function of the power of the pump laser for various degrees of transmission T of the output coupler 3. In case of a degree of transmission T of 1% a quantum efficiency η of 6,6% results. The latter increases at a degree of outcoupling T of 2% to a value of η=20%. The degree of outcoupling T=1% represents the smallest practically usable degree of outcoupling of the output coupler 3. In case of an inventive laser system as realized here with a ring resonator, optimized to a pulse repetition frequency of 1 GHz, the degree of outcoupling T=2% represents the experimentally determined optimum of degree of outcoupling T. Nevertheless also higher degrees of outcoupling T may be suitable.

What is claimed is:

1. Passive mode locked femtosecond laser having a ring resonator comprising:

a laser-active element having a group velocity dispersion;

a prismatic element having a group velocity dispersion;

at least one dielectric mirror, having a negative group velocity dispersion ($GVD_n$) for reflection;

two concave mirrors which are spatially arranged immediately adjacent to the laser-active element and are oriented with their concave surfaces towards the laser-active element; and an optical output coupler, wherein the ring resonator has an optical path and each of said laser-active element, prismatic element and mirrors is arranged along the optical path, and wherein for a contiguous part of the optical spectrum capable of being amplified by the laser-active element, the value of the negative group velocity dispersion associated with the at least one dielectric mirror is greater than the combined value of the positive group velocity dispersion associated with the laser active element and the prismatic element, characterized in that the optical path of the resonator is below 120 cm, the focus length of each of the concave mirrors, which are arranged adjacent next to the laser-active element is below 3 cm, whereby a high repetition generation of femtosecond pulses is attainable and one of (i) said at least one dielectric mirror or (ii) the output coupler or (iii) a further mirror is tiltable at a tilt angle upon an axis wherein by adjusting the tilt angle in interplay with the spatial dispersion of the prismatic element, a wavelength is adjustable for which the resonator supports laser activity.

2. The laser according to claim 1, wherein the optical path length of the resonator is below 60 cm.

3. The laser according to claim 1, wherein the optical path length of the resonator is below 30 cm.

4. The laser according to claim 1, wherein the optical path length of the resonator is below 15 cm.

5. The laser according to claim 1, wherein the focus length of each of the concave mirrors is below 2 cm.

6. The laser according to claim 1, wherein the focus length of each of the concave mirrors is below 1.5 cm.

7. The laser according to claim 1, characterized in that the laser-active element is also self-focusing element.

8. The laser according to claim 1, characterized in that the resonator is adapted in interplay with the non-linear element, such that pulsed laser activity allows a higher energy output from the laser-active element as compared to continuous laser activity.

9. The laser according to claim 1, characterized in that the prismatic element has a surface and a surface of exit adapted to have an optical beam incident on the prism surface under condition of minimal deflection wherein the optical beam is incident on the prism surface at a Brewster angle for the wavelength amplifiable by the laser-active medium and escapes at the Brewster angle from the surface of exit.

10. The laser according to claim 1, characterized in that the prismatic element has a prism surface of exit adapted to have an optical beam incident on the prism surface at a Brewster angle for the wavelength amplifiable by the laser-active medium, wherein the optical beam escapes substantially at a right angle from the surface of exit.

11. The laser according to claim 10, characterized in that an antireflection coating for the wavelength amplifiable by the laser-active medium is applied to the surface of exit.

12. Passive mode locked femtosecond laser having a ring resonator comprising:

a laser-active element having a group velocity dispersion;

at least one dielectric mirror having a negative group velocity dispersion ($GVD_n$) for reflection;

two concave mirrors which are spatially arranged immediately adjacent to the laser-active element and are oriented with their concave surfaces towards the laser-active element; and an optical output coupler;

wherein the ring resonator has an optical path and each of said laser-active element and mirrors is arranged along the optical path, and wherein for a contiguous part of the optical spectrum capable of being amplified by the laser-active element, the value of the negative group velocity dispersion associated with the at least one dielectric mirror is greater than the value of the positive group velocity dispersion associated with the laser active element, characterized in that the optical path of the resonator is below 60 cm, and the focus length of each of the concave mirrors which are arranged immediately adjacent to the laser-active element is below 3 cm, whereby a high repetition generation of femtosecond pulses is attainable.

13. The laser according to claim 12, wherein the optical path length of the resonator is below 30 cm.

14. The laser according to claim 12, wherein the optical path length of the resonator is below 15 cm.

15. The laser according to claim 12, wherein the focus length of each of the concave mirrors is below 2 cm.

16. The laser according to claim 12, wherein the focus length of each of the concave mirrors is below 1.5 cm.

17. The laser according to claim 1 or 12, characterized in that both focus lengths of the concave mirrors which are adjacent to the laser-active elements are substantially equal in value.

18. The laser according to claim 1 or 12, characterized in that the distance of the concave mirrors to each other, which are adjacent to the laser-active element is smaller than the sum of their focus lengths.

19. The laser according to claim 18, characterized in that the distance of the laser-active element from a first concave mirror differs by more than 2% from the distance of the laser-active element from a second concave mirror.

20. The laser according to claim 19, wherein the distance differs by more than 50%.

21. The laser according to claim 19, wherein the distance differs by more than 10%.

22. The laser according to claim 1 or 12, characterized in that the distance of the concave mirrors to each other which are adjacent to the laser-active element is greater than the sum of focus lengths of the concave mirrors, and a ring aperture is located in the ring resonator.

23. The laser according to claim 1 or 12, characterized in that the laser-active element substantially comprises at least one of Ti:Saphir, Cr:LiSAF, Cr:Forsterite, Cr:LiSGaF, CR:LiCAF and Yb:YAG.

24. The laser according to claim 1 or 12, comprising a frequency doubled Nd:YVO$_4$-, Yb:YVO$_4$-, Nd:YAG- or Yb:YAG-laser used as a pump laser.

25. The laser according to claim 1 or 12 characterized in that the degree of outcoupling of the optical output coupler is below 5%.

26. The laser according to claim 25, wherein the degree of outcoupling is below 3%.

27. The laser according to claim 25, wherein the degree of outcoupling is below or equal to 2%.

28. The laser according to claim 1 or 12, characterized in that the output coupler is configured as a partial reflecting mirror.

29. The laser according to claim 1 or 12, characterized in that all mirrors have a negative group velocity dispersion (GVD).

30. The laser according to claim 1 or 12, characterized in that only one mirror has a negative group velocity dispersion (GVD).

31. The laser according to claim 1 or 12, characterized in that a ring resonator is compensated for astigmatism.

32. The laser according to claim 1 or 12, characterized in that all elements of a ring resonator are mechanically arranged on a common mounting platform.

33. The laser according to claim 1 or 12 characterized in that two beams are reflected by each of the concave mirrors and an angle enclosed between the beaus amounts between 15° and 25°.

34. A method for obtaining a generation of femtosecond pulses from and turning a passive mode locked femtosecond laser having a ring resonator comprising a laser-active element having a group velocity dispersion, a prismatic element having a group velocity dispersion, at least one dielectric mirror having a negative group velocity dispersion (GVD$_n$) for reflection, two concave mirror which are spatially arranged immediately adjacent to the laser-active element and are oriented with respective concave surfaces towards the laser-active element, and an optical output coupler, wherein the ring resonator has an optical path and each of said laser-active element, prismatic element and mirrors is arranged along the optical path, and wherein for a contiguous part of the optical spectrum capable of being amplified by the laser-active element, the value of the negative group velocity dispersion associated with the at least one dielectric mirror is greater than the combined value of the positive group velocity dispersion associated with the laser active element and the prismatic element, characterized in that the optical path of the resonator is below 120 cm, the focus length of each of the concave mirrors, which are arranged adjacent next to the laser-active element is below 3 cm, where in a first step a high repetition generation of femtosecond pulses is obtained and in a second step one of (i) said at least one dielectric mirror or (ii) the output coupler or (iii) a further mirror is tiltable at a tilt angle upon an axis wherein by adjusting the tilt angle in interplay with the spatial dispersion of the prismatic element, a wavelength is adjusted for which the resonator supports laser activity.

35. The method according to claim 34, characterized in that the passive mode coupled femtosecond laser is operated at a pulse repetition rate exceeding 500 MHz.

36. The method according to claim 34, characterized in that the passive mode femtosecond laser is operated at a pulse repetition rate exceeding 1 GHz.

37. The method according to claim 34, characterized in that the passive mode femtosecond laser is operated at a pulse repetition rate exceeding 2 GHz.

38. The method according to claim 34, characterized in that the passive mode femtosecond laser is operated at a pulse repetition rate exceeding 10 GHz.

39. A method for obtaining a generation of femtosecond pulses from a passive mode locked femtosecond laser having a ring resonator comprising a laser-active element having a group velocity dispersion, at least one dielectric mirror having a negative group velocity dispersion (GVD$_n$) for reflection, two concave mirrors which are spatially arranged immediately adjacent to the laser-active element and are oriented with respective concave surfaces towards the laser-active element and an optical output coupler, wherein the ring resonator has an optical path and each of said laser-active element and mirrors is arranged along the optical path, and wherein for a contiguous part of the optical spectrum capable of being amplified by the laser-active element, the value of the negative group velocity dispersion associated with the at least one dielectric mirror is greater than the value of the positive group velocity dispersion associated with the laser active element, characterized in that the optical path of the resonator is below 60 cm, and the focus length of each of the concave mirrors which are arranged immediately adjacent to the laser-active element is below 3 cm, where a high repetition generation of femtosecond pulses is attained.

40. The method according to claim 39, characterized in that the passive mode coupled femtosecond laser is operated at a pulse repetition rate exceeding 500 MHz.

41. The method according to claim 39, characterized in that the passive mode femtosecond laser is operated at a pulse repetition rate exceeding 1 GHz.

42. The method according to claim 39, characterized in that the passive mode femtosecond laser is operated at a pulse repetition rate exceeding 2 GHz.

43. The method according to claim 39, characterized in that the passive mode femtosecond laser is operated at a pulse repetition rate exceeding 10 GHz.

44. Passive mode coupled femtosecond laser having a ring resonator comprising:

a laser-active element having a group velocity dispersion;

two concave mirrors which are spatially arranged immediately adjacent to the laser-active element and are oriented with their concave surfaces towards the laser-active element;

at least one dielectric mirror receiving a reflection from at least one of said concave mirror, having a negative group velocity dispersion for reflection and wherein for a contiguous part of the optical spectrum capable of being amplified by the laser-active element, the value of the negative group velocity dispersion associated with the at least one dielectric mirror is greater than the value of the positive group velocity dispersion associated with the laser active element; and an optical output coupler receiving a reflection from at least one of said at least one concave mirror and dielectric mirror, whereby a high repetition generation of femtosecond pulses is obtained.

45. Passive mode coupled femtosecond laser having a ring resonator comprising:

a laser-active element having a group velocity dispersion, two concave mirrors which are spatially arranged immediately adjacent to tee laser-active element and are oriented with their concave surfaces towards the laser-active element;

at least one dielectric mirror, having a negative group velocity dispersion for reflection and wherein for a contiguous part of the optical spectrum capable of being amplified by the laser-active element, the value of the negative group velocity dispersion associated with the at least one dielectric mirror is greater than the value of the positive group velocity dispersion associated with the laser active element; and an optical output coupler, wherein the ring resonator has an optical path and each of said laser-active element, mirrors and coupler is arranged along the optical path, and whereby a high repetition generation of femtosecond pulses is obtained.

46. Passive mode coupled femtosecond laser having a ring resonator comprising:

a laser-active element having a group velocity dispersion;

a prismatic element having a group velocity dispersion, two concave mirrors which are spatially arranged immediately adjacent to the laser-active element and are oriented with their concave surfaces towards the laser-active element;

at least one dielectric mirror, having a negative group velocity dispersion for reflection and wherein for a contiguous part of the optical spectrum capable of being amplified by the laser-active element, the value of the negative group velocity dispersion associated with the at least one dielectric mirror is greater than the value of the positive group velocity dispersion associated with the laser active element; and an optical output coupler, wherein the ring resonator has an optical path and each of said laser-active element, mirrors and coupler is arranged along the optical path, and whereby a high repetition generation of femtosecond pulses is obtained, and one of said at least one dielectric mirror, output coupler, or a further mirror is tiltable at a tilt angle upon an axis wherein by adjusting the tilt angle in interplay with the spatial dispersion of the prismatic element, a wavelength is adjusted for which the resonator supports laser activity.

47. Passive mode coupled femtosecond laser having a ring resonator comprising:

a laser-active element having a group velocity dispersion;

two concave mirrors which are spatially arranged immediately adjacent to the laser-active element and are oriented with their concave surfaces towards the laser-active element;

at least one dielectric moor receiving a reflection from at least one of said concave mirror, and a prismatic element receiving a reflection from the at least one dielectric mirror, wherein the at least one dielectric mirror has a negative group velocity dispersion for reflection and wherein for a contiguous part of the optical spectrum capable of being amplified by the laser-active element, the value of the negative group velocity dispersion associated with the at least one dielectric mirror is greater than the combined value of the positive group velocity dispersion associated with the laser active element and at least one prismatic element; and an optical output coupler receiving a reflection from at least of one of said concave mirror and at least one dielectric mirror, whereby a high repetition generation of femtosecond pulses is obtained, and one of said at least one dielectric mirror, output coupler, or a further mirror is tiltable at a tilt angle upon an axis wherein by adjusting the tilt angle in interplay with the spatial dispersion of the prismatic element, a wavelength is adjusted for which the resonator supports laser activity.

* * * * *